United States Patent
Takishima

[11] 3,765,312
[45] Oct. 16, 1973

[54] EXPOSURE CONTROL DEVICE
[75] Inventor: Yoshiyuki Takishima, Tokyo, Japan
[73] Assignee: Canon Kabushiki Kaisha, Tokyo, Japan
[22] Filed: May 25, 1972
[21] Appl. No.: 256,998

[30] Foreign Application Priority Data
May 28, 1971 Japan.............................. 46/36799
May 28, 1971 Japan.............................. 46/36800

[52] U.S. Cl............................ 95/10 CE, 95/53 EB
[51] Int. Cl. ............................................. G03b 7/08
[58] Field of Search .......... 95/10 C, 10 CE, 10 CT, 95/53 EA, 53 EB, 64 R, 64 B, 64 C, 64 D

[56] References Cited
UNITED STATES PATENTS
| | | | |
|---|---|---|---|
| 3,695,158 | 10/1972 | Fahlenberg...................... | 95/10 CE |
| 3,581,643 | 6/1971 | Yoshimura ................... | 95/10 CE X |
| 3,452,656 | 7/1969 | Ruhle et al. ...................... | 95/10 CE |
| 3,426,662 | 2/1969 | Sevin ............................... | 95/10 CE |
| 3,670,634 | 6/1972 | Kessler et al. ................ | 95/10 CT X |
| 3,503,313 | 3/1970 | Kuramoto ..................... | 95/53 EB X |
| 3,625,124 | 12/1971 | Miyakawa........................ | 95/10 CT |
| 3,593,629 | 7/1971 | Rentschler........................ | 95/10 CE |
| 3,602,717 | 8/1971 | Konig ........................... | 95/10 CT X |

FOREIGN PATENTS OR APPLICATIONS
10,625    5/1969    Japan............................... 95/10 CT Primary Examiner—Joseph F. Peters, Jr.
Attorney—William R. Woodward

[57] ABSTRACT

A light sensitive resistor for measuring light value of a scene to be photographed is in a bridge circuit from which the unbalance signal operates switches either to light lamps for guiding manual adjustment of exposure factors or to control a servomotor that makes the necessary adjustments. These adjustments, whether automatic or manual, produce changes in the bridge elements, so that balance of the bridge is reached when the proper exposure factor settings are made. Control of the servomotor and/or indication lamps is accomplished by means of an astable multivibrator of which the effective polarity of the output is changed by changing the duty cycle. The exposure factor adjustment obtained by balancing the bridge is stored in the value of a variable resistor which, after the shutter is released, controls, for example, the exposure time.

10 Claims, 4 Drawing Figures

EXPOSURE CONTROL DEVICE

BACKGROUND OF THE INVENTION

The present invention relates to a photoelectric exposure control device especially suitable for compact cameras.

Automatic of manual exposure control devices are known for use with still cameras or cine cameras in which a photoconductive or photoelectric element is used to measure the light intensity of a subject. For example in an automatic exposure control device, a servomotor may be driven in response to the output of a photoelectric cell so that an optimum aperture or shutter speed may be set. More particularly the photoelectric cell constitutes one arm of a bridge circuit, and an aperture setting device which is disposed in front of the photoelectric cell and is drivingly coupled to the servomotor is actuated and stopped when the bridge circuit is balanced, the servomotor is stopped. In this way, the optimum aperture may be set.

SUMMARY OF THE INVENTION

One of the objects of the present invention is to provide an exposure control device in which in addition to a bridge circuit including a photoelectric cell as one arm, means is provided for obtaining a desired shutter speed or aperture, and an exposure factor control circuit is adjusted automatically by a servomotor or manually by reference to a lamp indication of the balance or unbalance of when the bridge circuit.

In the present invention an exposure control device is provided in which prior to the shutter release the resistance of a photoelectric cell is stored in a resistor which constitutes one arm of a balanced bridge circuit, and in response to this stored resistance, the shutter speed is controlled. The electronic circuit is symmetrical and voltage stabilizing or regulation circuits are provided. A motor is intermittently driven. The exposure control device is reliable in operation with a high degree of accuracy.

Another feature of the present invention is an exposure control device in which the output of a bridge circuit, which is used as a photometric circuit, is detected by a differential type detector circuit and in response to the two outputs of said detector circuit two switching circuits are energized. In response to the outputs of the switching circuits, an astable multivibrator starts and stops oscillating with outputs of variable duty cycle. In one embodiment the balance or unbalance of the bridge circuit is indicated by lamps, whereby the optimum aperture or shutter speed may be manually set.

According to one aspect of the present invention, prior to the shutter release, an exposure factor such as aperture or shutter speed is determined in response to the light intensity of the subject and is stored so that the exposure is made in response to this stored exposure factor. The present invention is best suited for use in the so-called exposure control device capable of storing an exposure factor which is used in a single-lens reflex camera. In the so-called TTL camera in which a photoelectric cell is disposed for example in the proximity of an eyepiece in order to receive the light passing through a camera lens, the intensity of light which reaches a film may be measured with a higher degree of accuracy. However, when the mirror is pulled away from the light beam which falls on the film, no light is intercepted by the photoelectric cell. Therefore prior to the shutter release, the light intensity must be stored so that an aperture or shutter speed may be set to an optimum value in response to the stored data. The exposure control device in accordance with the present invention is best suited for use with the TTL single-lens reflex camera of the type described, but it should be understood that the present invention may be also applied to other cameras of the type in which the light intensity of a subject is measured and stored before the shutter release is pressed.

DESCRIPTION OF THE PREFERRED EMBODIMENTS

Figure 1:
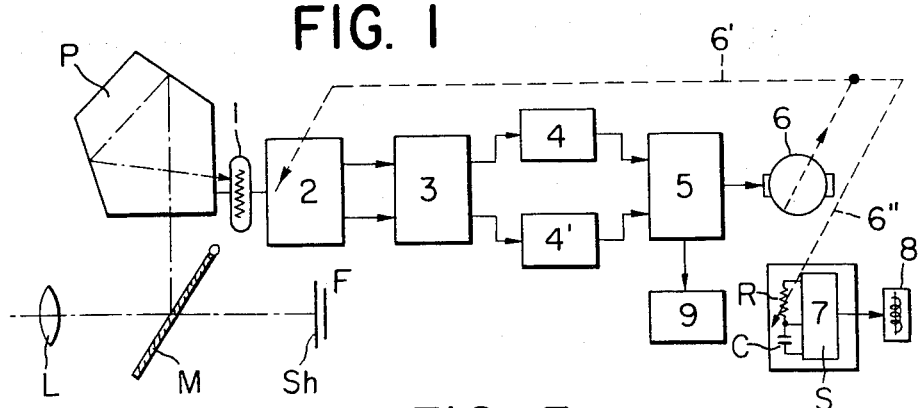
FIG. 1 is a block diagram of a first embodiment of an exposure control device in accordance with the present invention.

Referring now to FIG. 1, the first embodiment of the present invention which is shown as being applied to a single-lens reflex camera will be described. The light from a subject passing through a camera lens L is reflected by a mirror M and a penta prism P, and intercepted by a photoelectric cell 1, which is shown as being a CdS cell in the instant embodiment and constitutes one arm of a bridge circuit 2. A variable resistor R in an electronic shutter speed control circuit 7 constitutes one arm of the bridge circuit 2 and is controlled by a d-c servomotor 6 as will be described in more detail hereinafter. Variable resistors which constitute the two arms of the bridge circuit 2 are set depending upon the exposure factors as will be described in more detail hereinafter. In response to the two outputs from a differential amplifier type detector circuit 3, two switching circuits 4 and 4' are actuated, and in response to the outputs of the switching circuits 4 and 4' an astable multivibrator 5 starts and stops oscillating at definite times with a desired waveform. In response to the outputs from the astable multivibrator 5, the d-c servomotor 6 rotates so as to vary the resistance of the variable resistor R which also constitutes a time constant circuit with a capacitor C in the electronic shutter speed control circuit 7 and which is operatively coupled to the d-c servomotor 6 as indicated by the dashed line 6". The shutter speed control circuit 7 further includes a switching circuit such as a Schmitt circuit which makes transistions between two stable states in response to the polarity of the voltage applied across the capacitor C. An electromagnet 8 actuates a shutter mechanism (not shown), and a display circuit 9 incorporates a flash lamp which indicates the balanced or unbalanced condition of the bridge circuit 2.

Next the mode of operation of the first embodiment will be described. The film speed or sensitivity and an aperture or stop are set in the bridge circuit 2, and the light from the subject is intercepted by the photoelectric cell 1. The unbalanced bridge 2 is detected by the differential type detector circuit 3 so that in response to the polarity of the output from the bridge circuit 2 the detector circuit 3 actuates either of the switching circuits 4 or 4'. For example, the switching circuit 4 is ON whereas the switching circuit 4' is OFF. The astable multivibrator 5 starts oscillating and the d-c servomotor 6 starts to rotate so that the resistance of the variable resistor R in one arm of the bridge circuit 2 is varied to balance the bridge circuit 2. When the bridge circuit 2 is balanced, the output of the detector circuit 3 becomes zero so that both the switching circuits 4 and 4' are turned OFF. As a result the astable multivibrator 5 stops oscillating so that the d-c servomotor 6 also stops. Hence the time constant of the time constant circuit R and C is set in response to the resistance of the photoelectric cell 1, because the resistance of the variable resistor R has been varied to balance the bridge circuit 2. Therefore, in response to this time constant the shutter speed is determined to obtain the optimum exposure. In summary, according to the present invention, the resistance of the photoelectric cell 1 before the shutter is actuated is stored as the resistance of the variable resistor in one arm of the bridge circuit and also of the shutter speed control circuit. Since the lamp in the display circuit 9 flashed to indicate whether the bridge circuit 2 is balanced or not balanced, an alarm signal indicating that the light incident upon the photoelectric cell 1 is too bright or too dark may be obtained.

Figure 2:
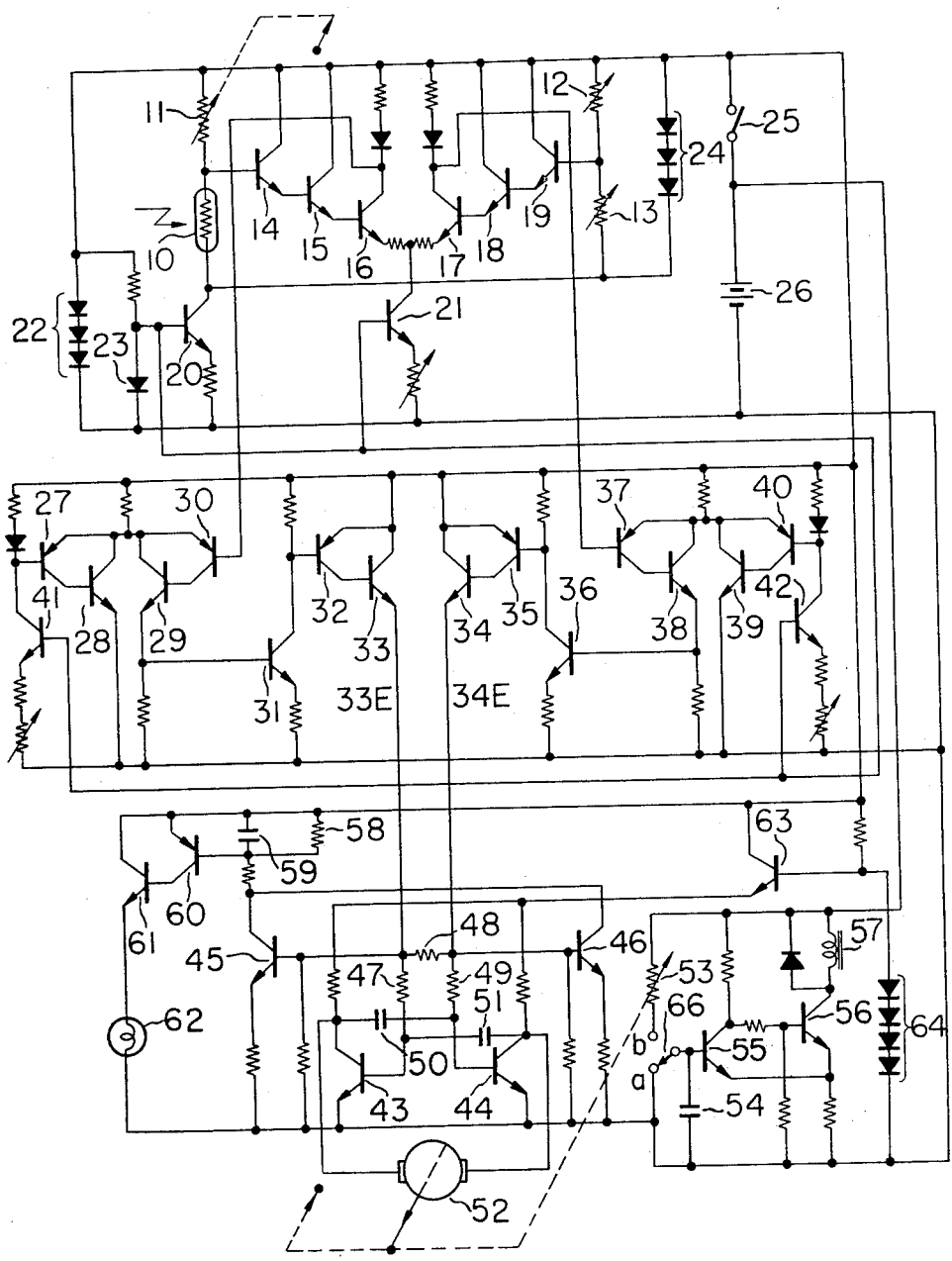
FIG. 2 is a practical electronic circuit diagram thereof.

Next referring to FIG. 2, the practical electric circuit of the first embodiment described so far with reference to FIG. 1 will be described in detail. In the circuit, a photoelectric cell 10 which corresponds to that designated by 1 in FIG. 1, a variable resistor 11 operatively coupled to a d-c servomotor 52 and two variable resistors 12 and 13 constitute a bridge circuit. The resistances of the variable resistors 12 and 13 are varied in response to the exposure factors such as the film speed or ASA and a desired stop which in turn are set for example by a film speed setting ring and an aperture setting ring respectively. The differential type detector circuit comprises six transistors 14–19, and a constant current circuit comprises two transistors 20 and 21 and diodes 22, 23 and 24. The power is supplied from batteries 26 through an ON-OFF power switch 25.

The two switching circuits comprise two sets of transistors 27–33 and 34–40, and the reference voltages at which the two switching circuits are actuated are obtained by varying the emitter voltages applied to transistors 41 and 42 which constitute a constant current circuit. The astable multivibrator comprises two transistors 43 and 44, and the time constant circuit comprises resistors 47, 48 and 49 and capacitors 50 and 51. The display circuit comprises transistors 45, 46, 60 and 61, a flash lamp 62, and a time constant circuit comprising a resistor 58 and a capacitor 59. A voltage stabilizing circuit comprises a transistor 63 and diodes 64. The time constant circuit in the electronic shutter speed control circuit comprises a resistor 53 which is operatively coupled to the d-c servomotor 52 and a capacitor 54. It should be noted that instead of the resistor 53, the resistor 11 in the bridge circuit may be used, but when the resistor 53 is used, the so-called gamma correction may become possible because the change in gamma ( which is a slow function of B in an expression given by $$I_p = CB$$

where $I_p$ = photocurrent of a photoelectric cell;
$C$ = constant; and
$B$ = light intensity )

may be compensated by varying the resistance of the variable resistor 53 per unit displacement of the sliding arm thereof.

The shutter speed control circuit ( denoted by 5 in FIG. 1 ) further comprises two transistors 55 and 56, and an electromagnet 57 which corresponds to that denoted by 8 in FIG. 1 actuates the shutter blinds of the conventional shutter mechanism ( not shown ). A selection switch 66 for actuating the shutter mechanism is operatively coupled to a shutter release button or the like ( not shown ).

Next the mode of operation will be described. First the power switch 25 is closed and the film speed and a desired aperture or stop are set in the variable resistors 12 and 13. In the TTL camera, the light from the subject passing through the camera lens is intercepted by the photoelectric cell 10 while the aperture blades ( not shown ) are maintained in the wide opened position ( exposure setting at maximum aperture ). The output of the unbalanced bridge circuit is detected by the differential type detector circuit 2 whose outputs in turn are applied to the transistors 30 and 37 of the input stages of the two switching circuits respectively and compared with the reference voltages. When the input voltage to the transistor 30 is lower than the reference voltage, the transistors 30–33 in one switching circuit are conductive whereas the transistors 34–40 in the other switching circuit are turned off. The output from the output stage of the one switching circuit comprising the transistors 32 and 33 is applied to the base electrodes of the transistors 43 and 44 in the astable multivibrator so that the latter starts oscillating. In this case, the duty cycle of the oscillating waveforms of the output from the astable multivibrator is determined depending upon the resistors $R_{47}$, $R_{48}$ and $R_{49}$ in the time constant circuit when the capacitances of the capacitors $C_{50}$ and $C_{51}$ are equal. Therefore, the outputs with the opposite polarities are derived from the astable multivibrator and applied to the d-c servomotor 52. That is, the positive and negative outputs with the pulse-like waveforms are applied to the d-c servomotor 52 so that the latter rotates in one direction which corresponds to the positive or negative output having a larger pulse width and the negative or positive output retards the rotation of the d-c servomotor 52. In response to the angle of rotation of the d-c servomotor 52, the resistance of the variable resistor 11 in the bridge circuit is varied so as to balance the latter. When the bridge circuit is balanced, the inputs to the differential type detector circuit have the same level so that the two switching circuits are turned off. As a result, no voltage is applied to the bases of the transistors 43 and 44 in the astable multivibrator so that the latter stops oscillating. Hence, the condition for attaining the optimum exposure, that is the resistance which the variable resistor 11 must have in order to balance the bridge circuit is now stored in the resistor 53 in the shutter speed control circuit which is operatively coupled to the d-c servomotor 52. Therefore, when the first shutter blind starts to travel to open the shutter in response to the shutter release operation, the movable contact of the selection switch 66 is switched from the stationary contact $a$ to the contact $b$ so that the capacitor 54 is charged through the resistor 53. Therefore in response to the time constant determined by the capacitor 54 and the resistor 53, the transistor 55 in the Schmitt trigger circuit is made conducting whereas the transistor 56 is turned off so that the electromagnet 57 is de-energized to cause the second rolled blind to travel a predetermined time after the first rolled blined has started to travel. Hence the shutter is now closed.

When either of the switching circuits is turned on, the transistors 45 and 46 in the display circuit are made conducting and the transistors 60 and 61 are then turned on at a predetermined time depending upon the time constant of the CR circuit 59 and 58 after the transistors 45 and 46 have been made conducting. As a result, the lamp 62 is turned on. The lamp 62 is turned off when the bridge circuit is balanced because the transistors in the display circuit are all turned off.

So far the mode of operation has been described in case of the exposure setting with maximum aperture, but in case of exposure setting with stopping down of the maximum F-number of the camera lens used, the appropriate correction is made by changing the aperture setting resistor in the bridge circuit by the aperture setting mechanism ( not shown ) which is actuated by the servomotor.

As described above, according to the present invention, the resistance of the photoelectric cell in the bridge circuit is stored in the resistor 53 by the servomotor 52 and in response to the shutter release operation the resistor 53 is switched to the time constant circuit in the shutter speed control circuit. Hence the light intensity of the subject before the shutter is released may be converted into the resistance and is stored in the resistor 53 so that the exposure setting may be accomplished with a higher degree of accuracy. The first embodiment described with reference to FIG. 2 is arranged almost entirely with differential type transistor circuits so that the operation will not be adversely affected by temperature variation and variation in supply voltage can be prevented from producing erratic operation. Furthermore, the circuit arrangement is almost symmetrical so that the circuit of the first embodiment may be formed as an integrated circuit. As this circuit may be fabricated in extremely compact form, it is well suited for incorporation in a miniature camera.

Figure 3:
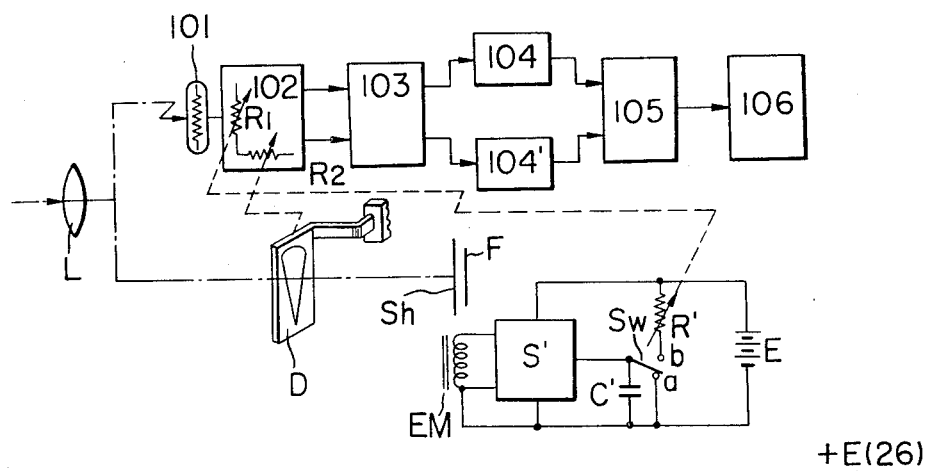
FIG. 3 is a block diagram of a second embodiment of the present invention.

Next referring to FIG. 3, the second embodiment of the present invention will be described. A photoelectric cell 101 from which is derived the electrical output representing the light intensity of the subject is inserted as one arm of a bridge circuit 102. In response to the outputs of the bridge circuit 102, a differential type detector circuit 103 actuates switching circuits 104 and 104' which in turn actuates an astable multivibrator 105. Either of two lamps in a display circuit 106 is turned on in order to indicate that the bridge circuit is unbalanced, and is turned off indicating the balanced bridge circuit. The light passing through the camera lens L is intercepted by the photoelectric cell 101. In the figure, a shutter blind disposed in front of a film F is denoted by Sh, and an aperture setting device D is operatively coupled to a variable resistor $R_2$. A variable resistor $R_1$ is operatively coupled to a shutter speed setting dial and to a variable resistor R' which constitutes a time constant circuit with a capacitor C'. The movable contact of a selection switch Sw is switched from the fixed contact a to the contact b in response to the shutter release operation. An electromagnet EM operatively coupled to a Schmitt trigger circuit S' actuates the shutter blind Sh.

In operation, the resistance of the variable resistor $R_1$ which is operatively coupled to the shutter speed setting dial or ring and which constitutes one of the arms of the bridge circuit 102 is set depending upon a shutter speed or film sensitivity, and the light from the subject passing through the camera lens L is intercepted by the photoelectirc cell 101. The output of the bridge circuit which is not balanced is detected by the differential type detector circuit 103 so that in response to the output of the detector circuit 103 either of the switching circuits 104 or 104' is actuated. In response to the output of the switching circuit 104 or 104', the astable multivibrator 105 starts oscillating. The duty cycle of the output of the astable multivibrator 105 changes depending upon which of the two switching circuits 104 and 104' is energized. The output of the astable multivibrator 105 is applied across the capacitor in the display circuit 106 so that either of the lamps may be turned on depending upon the voltage difference across the capacitor in order to indicate that the bridge circuit is unbalanced. Next the variable resistor in one arm of the bridge circuit which is operatively coupled to the aperture setting device D is so adjusted that the bridge circuit 102 may be balanced. When the bridge circuit 102 is balanced, the lamps in the display circuit are all turned off. Hence, the optimum aperture is obtained. In case of the exposure setting at stopping down, the aperture setting ring on the side of the interchangeable lens may be adjusted instead of the variable resistor $R_2$ so as to adjust the light incident upon the photoelectric cell 101 thereby balancing the bridge circuit 102. Alternatively, a desired aperture may be set by the adjustment of the variable resistor $R_2$ and the resistance of the variable resistor $R_1$ which is coupled to the shutter speed setting dial or the like may be varied in order to attain the balance of the bridge circuit, that is the optimum exposure setting. When the bridge circuit 102 is balanced and the lamps in the display circuit are turned off, the resistance of the variable resistor R' is also set to a desired value. Therefore, when the shutter button or the like is depressed, the shutter mechanism is actuated depending upon the time constant of the time constant circuit R' and C' as in the case of the first embodiment. Hence the shutter speed is controlled.

Figure 4:
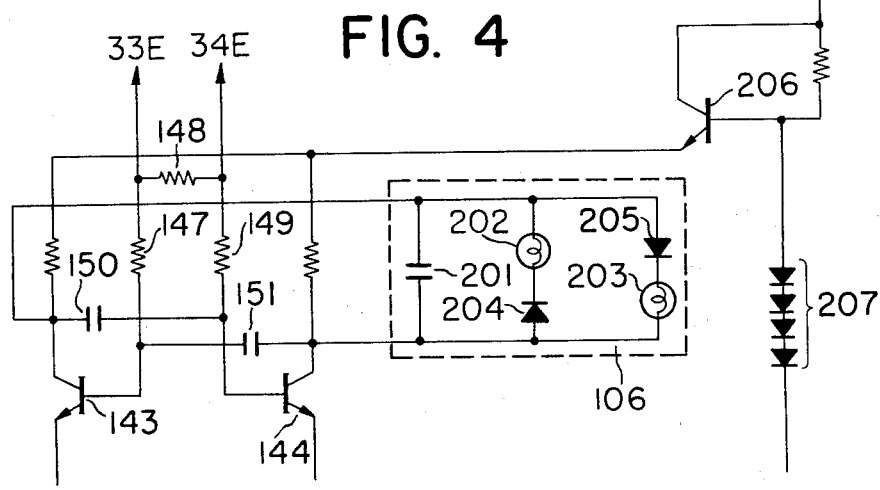
FIG. 4 is a practical electronic circuit diagram thereof.

Next referring to FIG. 4 illustrating the practical electric circuit of the second embodiment, the latter will be described in more detail. Since the arrangement of the photo-electric cell 101, the bridge circuit 102, the differential type detector circuit 103, and the switching circuits 104 and 104' are similar to those shown in FIG. 2, they are not shown for simplicity and only the astable multivibrator 105 and the display circuit 106 are shown in FIG. 4 and will be described in detail.

The astable multivibrator 105 comprises two transistors 143 and 144, resistors 147, 148 and 149 and capacitors 150 and 151. The period of the astable multivibrator 105 is determined by the resistors 147–149 and the capacitors 150 and 151. A capacitor 201 in the display circuit 106 is of non-polar type. Reference numerals 202 and 203 denote the lamps; 204 and 205, diodes; 206, a transistor in a constant current circuit of the display circuit 106; and 207, diodes for supplying a constant voltage.

Next the mode of operation will be described. In response to the light intensity, the resistance of the photo-electric cell 101 varies. The resistance of the variable resistor $R_1$ is varied depending upon the film sensitivity or shutter speed. The output of the unbalanced bridge circuit 102 is applied through the differential type detector circuit 103 to the bases of the transistors 143 and 144 in the astable multivibrator 105 so that the latter starts oscillating as in the case of the first embodiment. In this case, the duty cycle of the oscillating output of the astable multivibrator 105 is determined depending upon which of the two switching circuits 104 and 104' is energized. That is, when the capacitances of the capacitors 150 and 151 are equal, the duty cycle is a function of the ratio of the resistor $R_{147}$ to the series-connected resistors $R_{149}$ and $R_{148}$ when the switching circuit 140 is energized or of the ratio of the resistor $R_{149}$ to the series-connected resistors $R_{147}$ and $R_{148}$ when the switching circuit 104' is energized. The potential difference between the collectors of the transistors 150 and 151 in the astable multivibrator 105 is determined by the above ratio of the resistance when the capacitors $C_{150}$ and $C_{151}$ are equal in value and when the resistors $R_{147}$ and $R_{149}$ are also equal in value. Depending upon this potential difference the current flows through either of the diode 204 or 205 so that the lamp 203 or 204 is turned on. The lamps 202 and 203 are marked with the arrows which serve to indicate the direction of rotation of the aperture or shutter speed setting ring. That is, the aperture setting ring is rotated in the direction indicated by the arrow marked on the turned-on lamp 202 or 203 so as to vary the resistance of the variable resistor $R_1$ in the bridge circuit 102 to balance the latter. Then, the output of the bridge circuit 102 becomes zero so that the transistors in the switching circuits 104 and 104' are all turned off. As a result, no voltage is applied to the bases of the transistors 143 and 144 in the astable multivibrator 105 so that the latter stops oscillating. Therefore, both lamps 202 and 203 in the display circuit 106 are turned off, indicating that the aperture and the shutter speed are set for optimum exposure. In case of the exposure setting at stopping down, that is in case of balancing the bridge circuit 102 by controlling the light incident upon the photo-electric cell 101 by the adjustment of the aperture setting ring, the correction for the maximum F-number of the camera lens used may be made by the adjustment of the variable resistor in the bridge circuit 102.

Instead of the lamps 202 and 203 in the display circuit 106, photodiodes may be used, and instead of the two lamps, only one lamp may be connected between the collectors of the transistors 143 and 144 of the astable multivibrator 105 in order to indicate the balanced or unbalanced bridge circuit 102.

As described above, in the second embodiment of the electronic shutter in accordance with the present invention, the astable multivibrator starts and stops oscillating with the output waveforms of variable duty cycle in response to the outputs of the switching circuits, and the lamps are used to indicate the balanced or unbalanced bridge circuit so that the second embodiment is especially suited to be fabricated as an integrated circuit and that the voltage stabilization may be attained. Hence, the shutter release operation may be accomplished with a higher degree of accuracy.

I claim:

1. In an exposure control device controllable in response to the output of a photoelectric cell, an improvement comprising the combination of:
  a. light quantity control means,
  b. an astable multivibrator having two output terminals,
  c. a second control means interconnected between said two output terminals of said astable multivibrator for controlling said light quantity control means,
  d. switching means comprising at least one switching circuit which is actuated in response to the output of said photoelectric cell, said switching means being electrically coupled to said astable multivibrator for controlling the intervals at which said astable multivibrator makes transistions, and
  e. said light quantity control means including storage means which is controlled in response to the output of said second control means for storing an exposure factor as the state of a variable exposure factor control element prior to the shutter release operation and also including means for causing said element to control an exposure factor after shutter release.

2. An improvement as set forth in claim 1 wherein said astable multivibrator further includes a pair of time constant circuits whose time constants during multivibrator operation are different from each other and mutually interchangeable by operation of said switching means.

3. An improvement as set forth in claim 1 wherein said switching means includes a bridge circuit in one arm of which said photoelectric cell is located and the output terminals of which are electrically coupled to the input terminals of said switching means; and wherein said switching means is made conductive in response to the output of said bridge circuit when unbalanced and then causes said astable multivibrator to start oscillating.

4. An improvement as set forth in claim 1 wherein said second control means comprises a motor which is drivingly coupled to said variable exposure factor element.

5. An improvement as set forth in claim 1 wherein said light quantity control means has manual controls and said second control means comprises display means for guiding the use of said manual controls.

6. An improvement as set forth in claim 3 wherein said switching means comprises a pair of switching circuits which are differential amplifier circuits.

7. An improvement as set forth in claim 2 wherein said time constant circuits have a common resistor network and wherein said switching means comprises a bridge circuit one arm of which comprises said photoelectric cell, and a pair of switching circuits to which are applied the output of said bridge circuit, and wherein said switching circuits are coupled to said resistor network of said time constant circuits so as to complete said time constant circuits at one of two points, or not at all, according to the state of said switching means, such point of completion being such as to determine the sense of the disparity of said time constant.

8. An improvement as set forth in claim 3 wherein said astable multivibrator comprises two transistors and a pair of time constant circuits whose capacitors are coupled to a series of resistors differentially and unequally apportionable to said respective capacitors by selection through said switching means of the circuit return point in said series of resistors.

9. An improvement as set forth in claim 5 wherein said display circuit comprises a pair of lamps and a pair of diodes which are each inserted in series with one of said lamps, but poled in the opposite direction relative to each other, the series lamp-diode circuits being connected in parallel.

10. An improvement as set forth in claim 4 wherein said variable exposure factor element is a variable resistor and said light quantity control means comprises shutter speed control means which comprises a CR time constant circuit comprising said variable resistor and a capacitor, a detector circuit for detecting a voltage drop across said capacitor, and electromagnet means coupled to said detector circuit for closing a shutter when said voltage drop has reached a predetermined value, said motor being operatively coupled to said variable resistor for varying its resistance.

* * * * *